(12) United States Patent
Sonoda

(10) Patent No.: US 6,415,885 B2
(45) Date of Patent: Jul. 9, 2002

(54) STEERING DAMPER

(75) Inventor: Hirotetsu Sonoda, Saitama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/781,245

(22) Filed: Feb. 13, 2001

(30) Foreign Application Priority Data

Feb. 14, 2000 (JP) ........................................ 2000-035955

(51) Int. Cl.$^7$ ................................................. B62D 5/06
(52) U.S. Cl. ...................... 180/422; 180/441; 91/375 A
(58) Field of Search ................................. 180/421, 422, 180/423, 441, 442; 91/375 A

(56) References Cited

U.S. PATENT DOCUMENTS

| | | | |
|---|---|---|---|
| 5,910,889 A | * | 6/1999 | Larsen et al. ............... 307/105 |
| 6,217,296 B1 | * | 4/2001 | Miyazawa et al. .......... 417/220 |
| 6,267,040 B1 | * | 7/2001 | Sonoda et al. ................ 91/420 |
| 6,352,016 B1 | * | 3/2002 | Asbrand et al. ............ 137/468 |

* cited by examiner

*Primary Examiner*—Kevin Hurley
(74) *Attorney, Agent, or Firm*—Sughrue Mion, PLLC

(57) ABSTRACT

A steering damper has a flow passage control valve for switching and connecting among a pump, a tank and left and right chambers in a power cylinder in correspondence to a steering operation, and left and right cylinder passages (3, 4) for connecting to the left and right chambers. The steering damper is provided with left and right damper portions (10A, 10B) having variable throttle valves (6, 7) arranged in the middle of the respective cylinder passages and limiting an inflow to the flow passage control valve from the power cylinder and pilot operated check valves (8, 9) connected thereto in parallel and allowing an inflow from the flow passage control valve to the power cylinder. A pilot plunger (30) arranging them at positions close to the respective passages and sliding between the left and right damper portions is provided. Respective end portions of the pilot plunger are set to a pressure receiving surface for receiving the respective fluid pressure by being faced within the left and right cylinder passages and an operating surface for opening the pilot operated check valve in another passage by being operated by the fluid pressure within one cylinder passage.

10 Claims, 13 Drawing Sheets

STEERING DAMPER

BACKGROUND OF THE INVENTION

1. Field of the Invention

The present invention relates to a steering damper used for damping an impact when a reverse input is applied from a steering wheel side such as a kickback or the like, in a power steering apparatus which operates a power cylinder so as to obtain a power assist force (a steering assist force) by switching and controlling a flow passage control valve in accordance with a steering operation of a steering handle.

2. Description of the Related Art

In general, in a hydraulic power steering apparatus, there is provided a flow passage control valve for selectively connecting a pump and a tank to left and right chambers of a power cylinder in accordance with a steering operation of a steering handle. A pressurized oil is supplied to any of the chambers of the power cylinder by the flow passage control valve in accordance with a steering operation so as to apply a power assist force for turning a steered wheel.

In an automobile mounting the power steering apparatus mentioned above thereon, there is proposed a structure in which a steering damper is provided in the power steering apparatus, for example, in Japanese Patent Application Laid-Open Publication Nos. 61-12468 and 62-43367.

The steering damper mentioned above is structured so as to damp and reduce an impact generated by a reverse input applied from a steering wheel side, for example, due to an unevenness on a running road surface, an obstacle or the like at a time when the automobile runs (so-called kickback; hereinafter, simply refer to a reverse input), thereby preventing the impact from being transmitted to the steering handle.

A most popular structure in the conventional steering damper is provided with a throttle or a variable throttle for applying a resistance to a pressurized oil flow discharged from a return side chamber of the power cylinder together with a movement of a piston when the reverse input mentioned above is applied to right and left cylinder passages between a flow passage control valve in the power steering apparatus and right and left chambers in the power cylinder.

However, since the throttle or the variable throttle mentioned above becomes a flow passage resistance against the pressurized oil flow from the pump and the return side flow to the tank at a time of a positive input together with the steering operation of the steering handle, the throttle or the variable throttle reduces a response at a time of operating the power cylinder.

Accordingly, there is proposed by Japanese Patent Application Laid-Open Publication No. 62-43367 mentioned above a structure which can sufficiently supply the pressurized oil to the cylinder chamber from the pump via the flow passage control valve by constructing the throttle mentioned above by a variable throttle valve, disposing check valves in parallel to the variable throttle valve in the right and left cylinder passages, and opening the check valve in the cylinder passage corresponding to the positive input time caused by the steering operation.

In this conventional art, the variable throttle valve is structured such that an opening degree thereof can be varied in dependence on a vibration frequency within an oil chamber provided in the steering damper main body.

However, since the return side flow from the cylinder chamber passes through the throttle or the variable throttle even in the case that the check valve mentioned above is provided, the flow passage resistance is generated and a response of the power cylinder is reduced.

Further, in the conventional steering damper mentioned above, since the variable throttle valve for damping the impact at the reverse input time from the steering wheel side and the return side flow oil passage at the positive input time together with the steering operation from the steering handle are the same, there is a case that the supply of the pressurized oil is prevented even if it is necessary to sufficiently supply the pressurized oil, for example, at a time of suddenly steering or the like.

That is, when the variable throttle valve is provided with attaching great importance to a performance of damping the impact at the reverse input time, it is impossible to obtain a sufficient return side flow from the cylinder chamber at the positive input time together with the steering operation, so that it is impossible to supply a necessary amount of pressurized oil to the corresponding cylinder chamber.

Further, when the pressurized oil is insufficiently supplied as mentioned above, an operation of the power cylinder is delayed due to a lack of the pressurized oil supply, so that a turn following performance of the steering wheel becomes insufficient. In particular, a so-called hooking is generated in the operation of the steering handle at the sudden steering time and there is a risk that the steering operation becomes non-smooth.

In the power steering apparatus, in order to enable a smooth steering handle operation with no hooking at the positive input time and improve a response of the power cylinder so as to improve a turn following performance, it is necessary to increase the passage diameters of the right and left passages reaching the right and left chambers of the power cylinder. However, when the structure is made in the manner mentioned above, there is generated a problem at the reverse input time from the steering wheel side such as the kickback mentioned above or the like, so that it is desirable to employ a countermeasure which can satisfy requirements opposing to each other.

Further, in the power steering apparatus, it is desirable to employ a countermeasure which can reduce the number of parts constituting the steering damper mentioned above, simplify the structure and be easily assembled, thereby achieving a compact size of a whole of the apparatus and reducing a cost.

SUMMARY OF THE INVENTION

The present invention is made by taking the above matters into consideration, and an object of the present invention is to provide a steering damper which can satisfy a function as a steering damper for reducing an impact at a reverse input time from a steering wheel side such as a kickback or the like and can improve a turn following performance at a positive input time together with a steering operation of a steering handle.

Further, another object of the present invention is to provide a steering damper which can reduce a number of parts, can simplify a structure, can be easily assembled, can make a whole of the apparatus compact and can reduce a cost.

In order to achieve the objects mentioned above, in accordance with a first aspect of the present invention, there is provided a steering damper attached to a power steering apparatus provided with a flow passage control valve for selectively switching and connecting among a pump, a tank and right and left chambers in a power cylinder in correspondence to a steering operation, and a pair of right and left cylinder passages for connecting the flow passage control valve to the right and left chambers in the power cylinder, comprising:

a pair of right and left damper portions having a variable throttle valve arranged in the middle of each of the cylinder passages and limiting an inflow to the flow passage control valve from the power cylinder and a pilot operated check valve connected to the variable throttle valve in parallel and allowing an inflow from the flow passage control valve to the power cylinder; and a pilot plunger arranging the right and left damper portions at positions close to the respective cylinder passages and sliding between the right and left damper portions, wherein respective end portions of the pilot plunger are set to a pressure receiving surface for receiving the respective fluid pressure by being faced within the right and left cylinder passages and an operating surface for opening the pilot operated check valve in another cylinder passage by being operated by the fluid pressure within one cylinder passage.

In accordance with a second aspect of the present invention, there is provided a steering damper as recited in the first aspect, wherein a minimum valve opening degree of the variable throttle valve is set so as to allow a flow of the pressurized fluid when a flow amount within the cylinder passage is a little and apply a resistance to a flow of the pressurized fluid when the flow amount within the cylinder passage is increased.

In accordance with a third aspect of the present invention, there is provided a steering damper as recited in the first aspect or the second aspect, wherein the pilot operated check valve is constituted by a ball and a cylindrical seat portion, and the variable throttle valve is constituted by a hole portion formed from one end of the cylindrical seat portion to another end thereof and a valve plate opening and closing another end of the hole portion.

In accordance with a fourth aspect of the present invention, there is provided a steering damper as recited in the first aspect or the second aspect, wherein both of the pilot operated check valve and the variable throttle valve are constituted by a valve in which a leaf spring is set to a valve body.

In accordance with a fifth aspect of the present invention, there is provided a steering damper as recited in the fourth aspect, wherein the leaf spring constituting the pilot operated check valve and the leaf spring constituting the variable throttle valve are overlapped with each other in a state that they are opened in opposite directions to each other.

In accordance with the present invention, the impact at the reverse input time from the steering wheel side is damped and reduced by the resistance generated by the return side flow from the return side chamber of the power cylinder passing through the variable throttle valve provided in the cylinder passage in the return side. At this time, a fluid pressure in the cylinder chamber side becomes greater than a fluid pressure in the flow passage control valve side of the pilot operated check valve in the return side cylinder passage, the return side pilot operated check valve maintains a closed state, and the return side flow is restricted. Further, the pilot plunger is moved so as to open the supply side pilot operated check valve, and the flow within the supply side cylinder passage is secured.

Further, in accordance with the present invention, at the positive input time together with the steering operation, it is possible to supply the pressurized oil from the pump to the cylinder chamber by opening the pilot operated check valve in the supply side cylinder passage. Further, it is possible to open the pilot operated check valve in the return side cylinder passage by the operating surface of the pilot plunger moving by receiving the fluid pressure within the supply side cylinder passage mentioned above on a pressure receiving surface so as to reduce the flow passage resistance within the return side cylinder passage, thereby securing the flow from the return side cylinder chamber.

BRIEF DESCRIPTION OF THE DRAWINGS

FIGS. 5A and 5B show a cylindrical seat member at a time of setting a pilot operated check valve to a ball valve, in which FIG. 5A is a cross sectional view of a main portion and FIG. 5B is an end surface view thereof.

FIGS. 6A and 6B show a passage constituting member engaging another end side of a ball, in which FIG. 6A is a cross sectional view and FIG. 6B is an end surface view.

FIGS. 9A and 9B show a main portion taken along a line IX—IX in FIG. 8, in which FIG. 9A is an enlarged cross sectional view and FIG. 9B is a bottom sectional view.

DETAILED DESCRIPTION OF THE PRESENT INVENTION

FIGS. 1 to 7 show a first embodiment of a steering damper in accordance with the present invention. In this embodiment, a description will be given of a case that the steering damper is applied to a hydraulic power steering apparatus employing a pressurized oil as a pressurized fluid.

Figure 3:
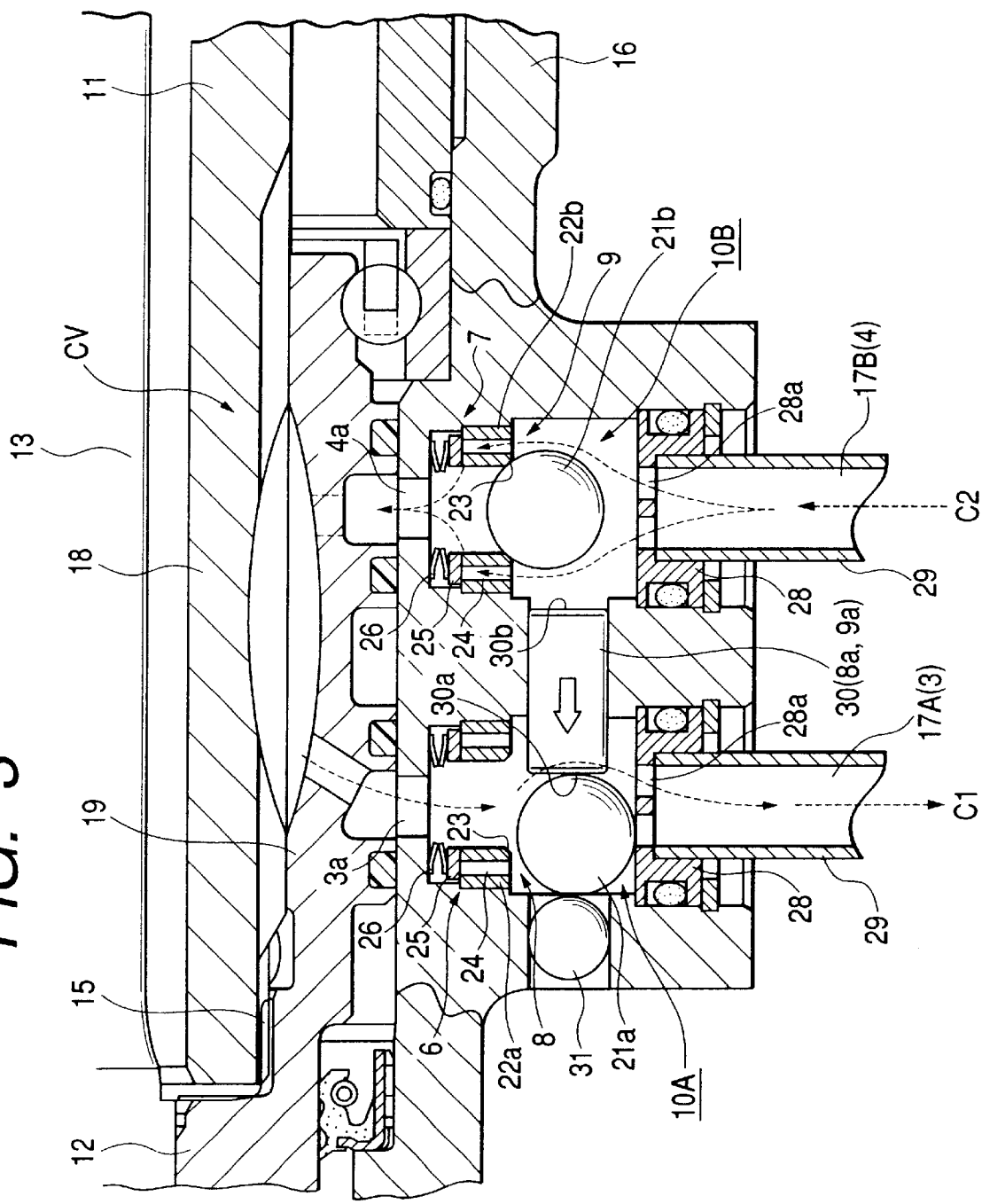
FIG. 3 is an enlarged cross sectional view of a main portion corresponding to FIG. 2, for explaining a state at a reverse input time from a steered wheel side (a state at a reverse input time when the steering operation is not performed and a state at a reverse input time in a rewinding direction during the steering operation).
Figure 4:
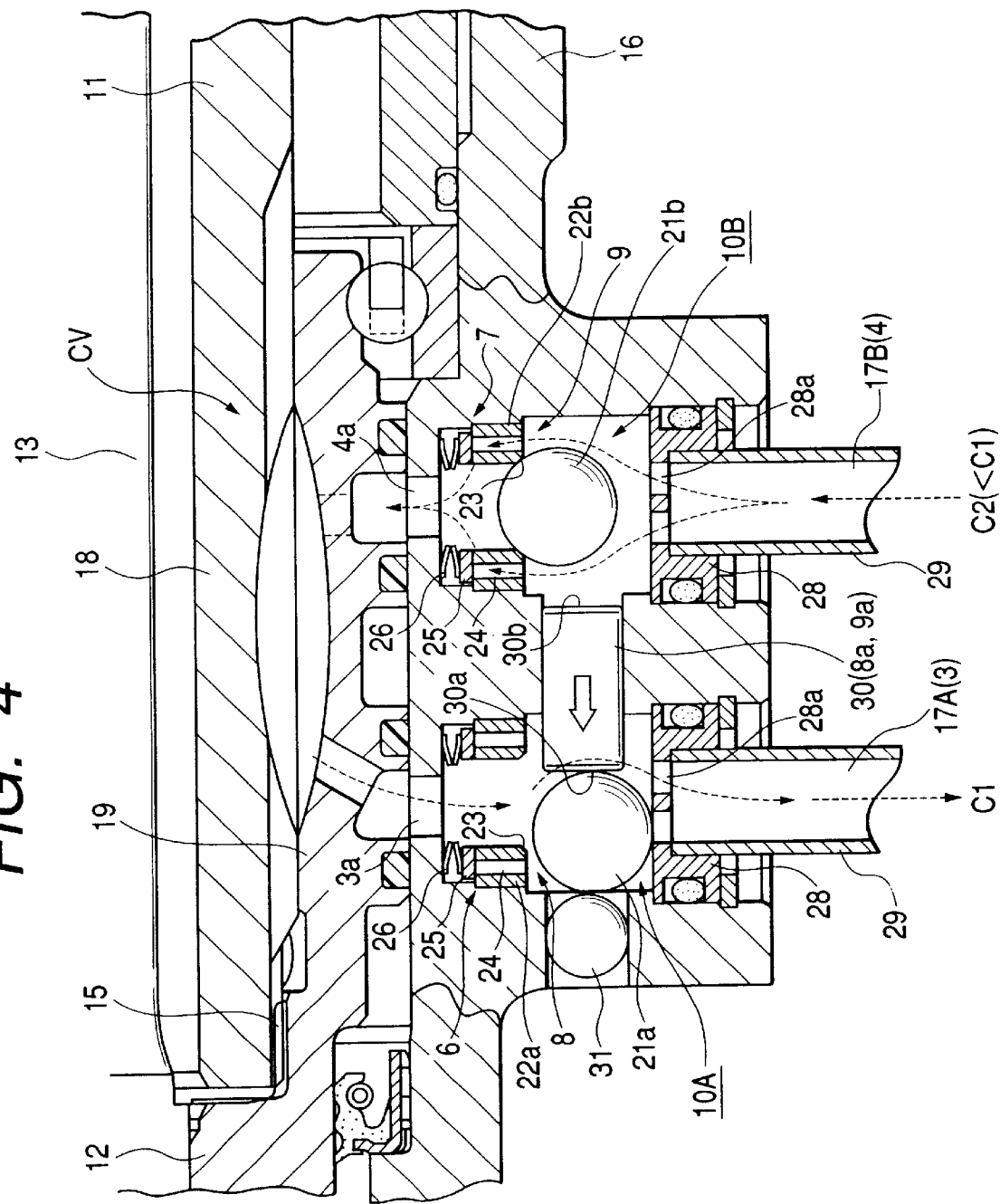
FIG. 4 is an enlarged cross sectional view of a main portion corresponding to FIGS. 2 and 3, for explaining a state at a reverse input time in a further turning direction during the steering operation.
Figure 5A:
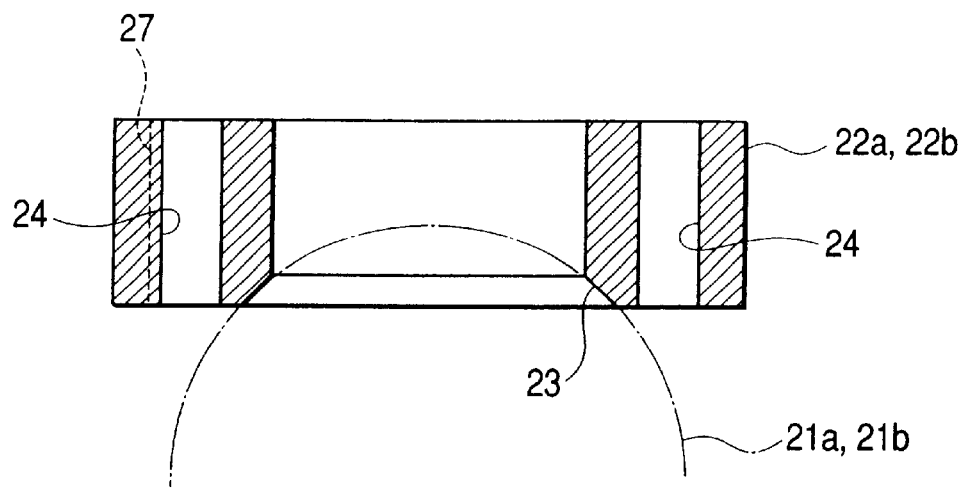
Figure 5B:
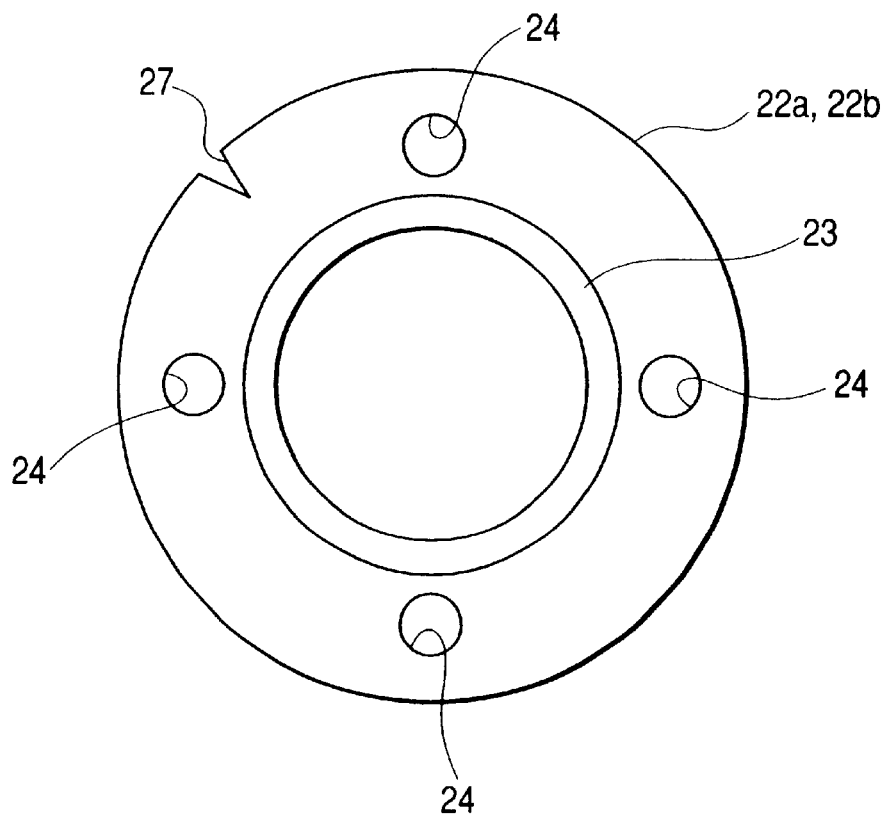
Figure 6A:
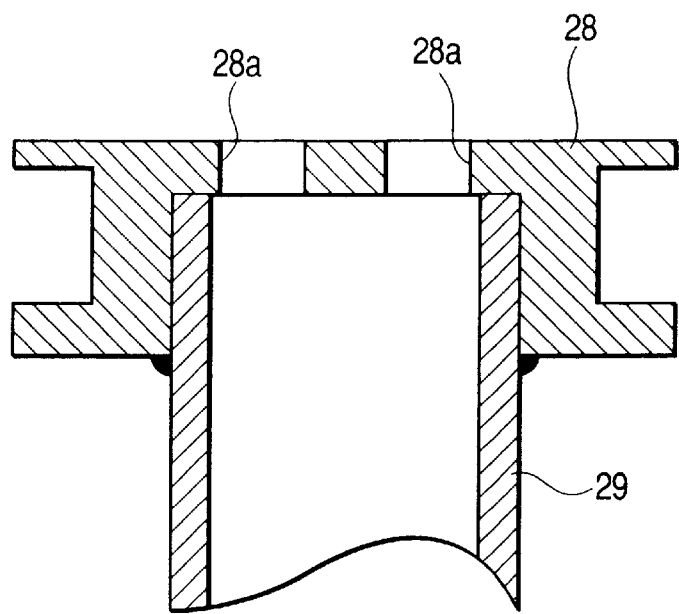
Figure 6B:
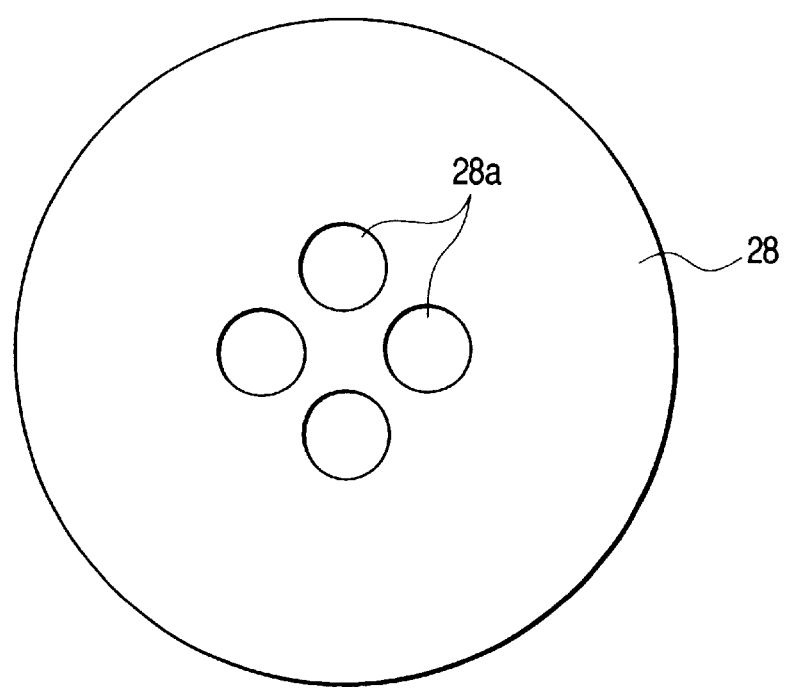
Figure 7:
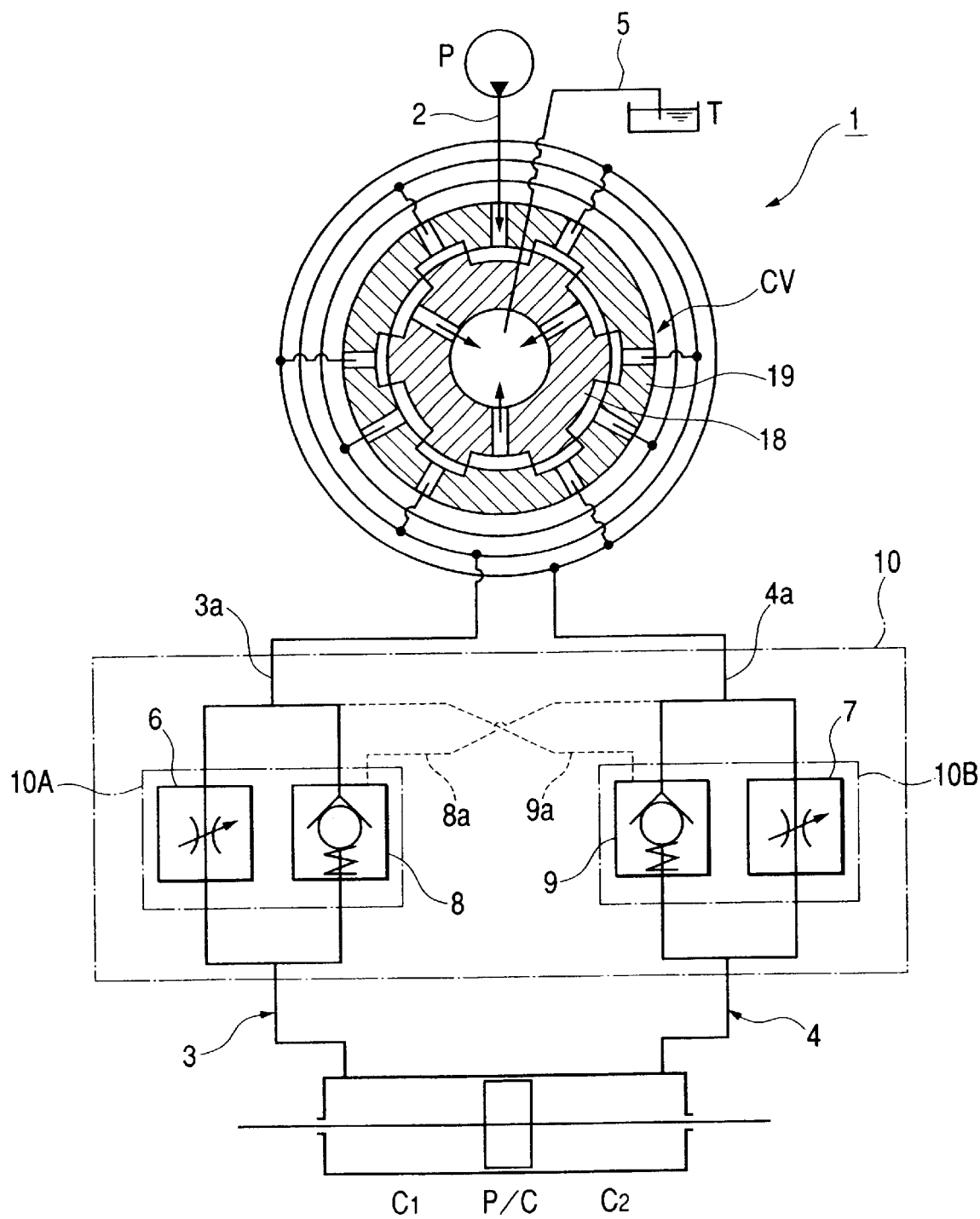
FIG. 7 is a schematic view for explaining a hydraulic circuit of a power steering apparatus in which a steering damper in accordance with the present invention is provided.

In this case, FIGS. 1 to 4 are view s for explaining a n operating state of a steering damper in the case of applying the steering damper in accordance with the present invention to a hydraulic power steering apparatus, FIGS. 5A and 5B are detailed views of a cylindrical seat member constituting a part of a variable throttle valve and forming a valve seat of a ball valve, FIGS. 6A and 6B are detailed views of a passage constituting member for assembling and holding a ball in a cylinder passage, and FIG. 7 is a view for explaining a hydraulic circuit of a power steering apparatus in which the steering damper in accordance with the present invention is provided.

In FIG. 7, a description will be given of a summary of a hydraulic circuit in the power steering apparatus wholly denoted by reference numeral 1. The hydraulic circuit is structured such as to supply a pressurized oil supplied from a pump P corresponding to an oil pressure source via a supply passage 2 to left and right chambers C1 and C2 of a power cylinder (denoted by reference symbol P/C) corresponding to an apparatus actuator via a flow passage control valve CV switched and controlled in accordance with a steering operation by a steering handle (not shown), and return the oil to a tank T.

Reference numerals 3 and 4 in the drawings respectively denote left and right cylinder passages to the left and right chambers of the power cylinder P/C, reference numeral 5 denotes a return passage returning from the flow passage control valve CV to the tank T.

In this case, in accordance with the present embodiment, there is employed a rotary type flow passage control valve CV comprising a rotor 18 and a sleeve 19 as mentioned below.

In the power steering apparatus 1 mentioned above, the flow passage control valve CV switches and controls the passages 3 and 4 to the left and right chambers C1 and C2 of the power cylinder P/C in correspondence to the steering operation state (for example, a steering direction, a steering angle, a steering speed and the like) of the steering handle. In accordance with the switching operation, the pressurized oil fed from the pump P is supplied to any of the chambers C1 and C2 and another chamber is connected to the tank T, whereby a power assist force for assisting a steering force can be obtained by the power cylinder P/C. Since this has been widely known, a detailed description thereof will be omitted here.

In the power steering apparatus 1 mentioned above, a pair of left and right variable throttles 6 and 7 constituting the steering damper 10 are respectively provided in the middle of the left and right cylinder passages 3 and 4. These variable throttles 6 and 7 are structured such that an opening area is changed in dependence of a passing flow amount in a return side flowing from any one of the chambers C1 and C2 of the power cylinder P/C to the tank T side via the flow passage control valve CV at a reverse input time from the steering wheel side such as a kickback or the like.

The variable throttles 6 and 7 can be damped and reduced by a flow passage resistance caused by passing the return side flow from the return side chamber C1 or C2 of the power cylinder P/C generated by an impact at the reverse input time from the steering wheel side, whereby it is possible to obtain a function as the damper. Further, the variable throttles 6 and 7 are structured such as to allow the return side flow flowing from the cylinder chamber to the flow passage control valve CV, be dependent on a passing flow amount, have a large throttle opening when a flow amount from the cylinder chamber is large, and have a small throttle opening when the flow amount is small.

In the left and right cylinder passages 3 and 4 of the power steering apparatus 1, a pair of left and right pilot operated check valves 8 and 9 constituting the steering damper 10 for preventing the return side flow connected from each of the chambers C1 and C2 of the power cylinder P/C to the tank T via the flow passage control valve CV are connected to the respective variable throttles 6 and 7 in parallel, whereby a pair of left and right damper portions 10A and 10B are constituted by these valves.

A pilot pressure transmitting means 8a and 9a (a pilot plunger 30 mentioned below) for transmitting the fluid pressure as a pilot pressure from passage portions 4a and 3a between the variable throttles 7 and 6 and the flow passage control valve CV and in respective another cylinder passage 4 and 3 sides are provided in the respective pilot operated check valves 8 and 9. Accordingly, the respective pilot operated check valves 8 and 9 are opened so as to obtain the return side flow from the respective chambers C1 and C2 of the power cylinder P/C to the flow passage control valve CV side in accordance with the transmission of the pilot pressure.

Further, the pilot operated check valves 8 and 9 are closed for preventing the return side flow at the reverse input time from the steering wheel side mentioned above. At the reverse input time, the pilot pressure is not transmitted to the pilot operated check valves 8 and 9 so that the pilot operated check valves 8 and 9 are opened.

On the contrary, at a positive input time in accordance with the steering operation of the steering handle, it is possible to supply the pressurized oil fed from the pump P to the cylinder chamber C1 or C2 by opening the pilot operated check valve 8 or 9 in the supply side cylinder passage 3 or 4. At this time, since it is possible to open the pilot operated check valve 9 or 8 in the return side cylinder passage 4 or 3 due to the pilot pressure constituted by the fluid pressure within the supply side cylinder passages 3 and 4 by the pilot pressure transmitting means 9a and 9a so as to secure a flow amount from the return side cylinder chamber C2 or C1, it is possible to improve a turn following performance together with the steering operation.

Figure 1:
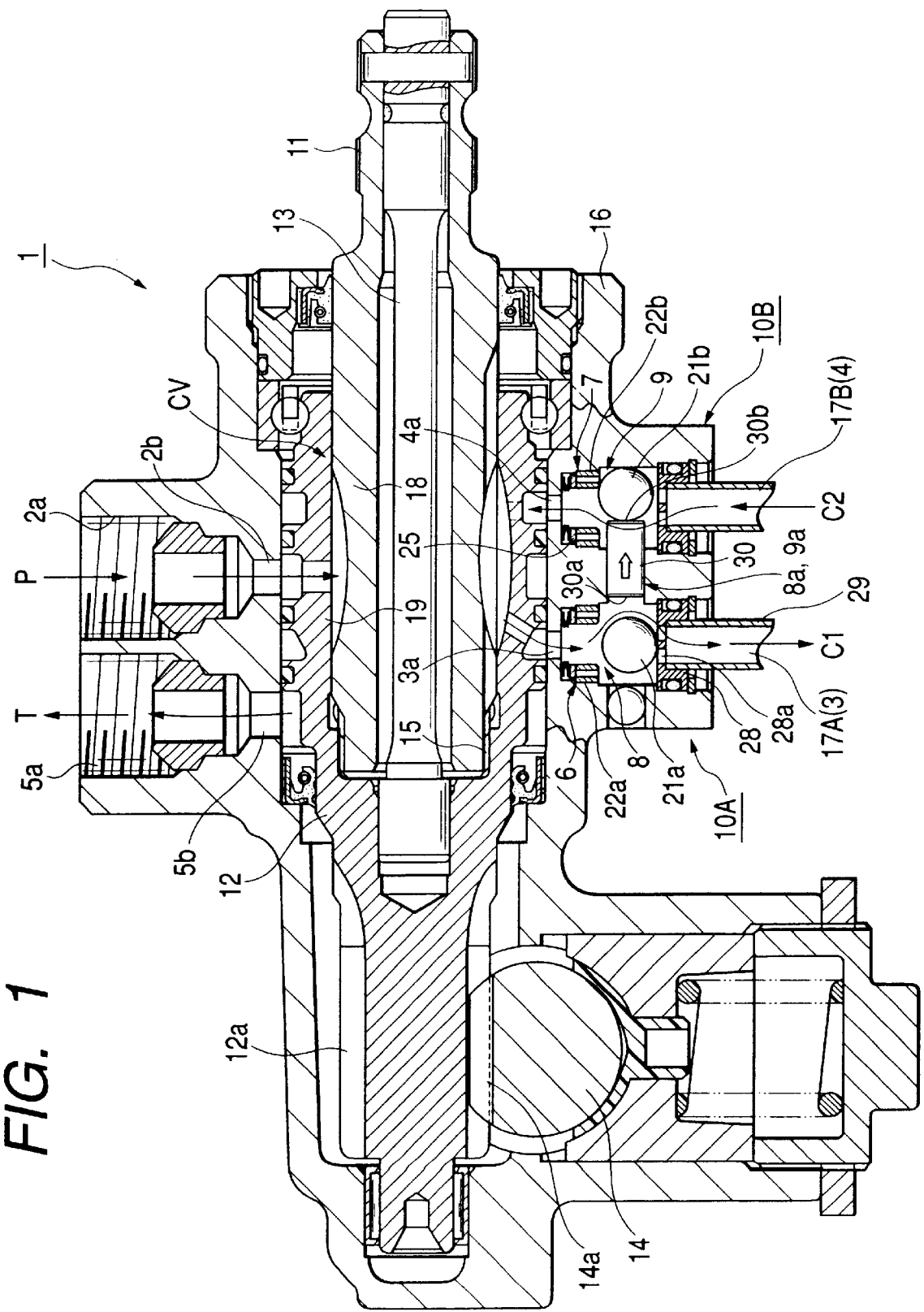
FIG. 1 is a cross sectional view showing a first embodiment of a steering damper in accordance with the present invention and showing a main portion of a main body portion of a power steering apparatus to which the steering damper is applied.
Figure 2:
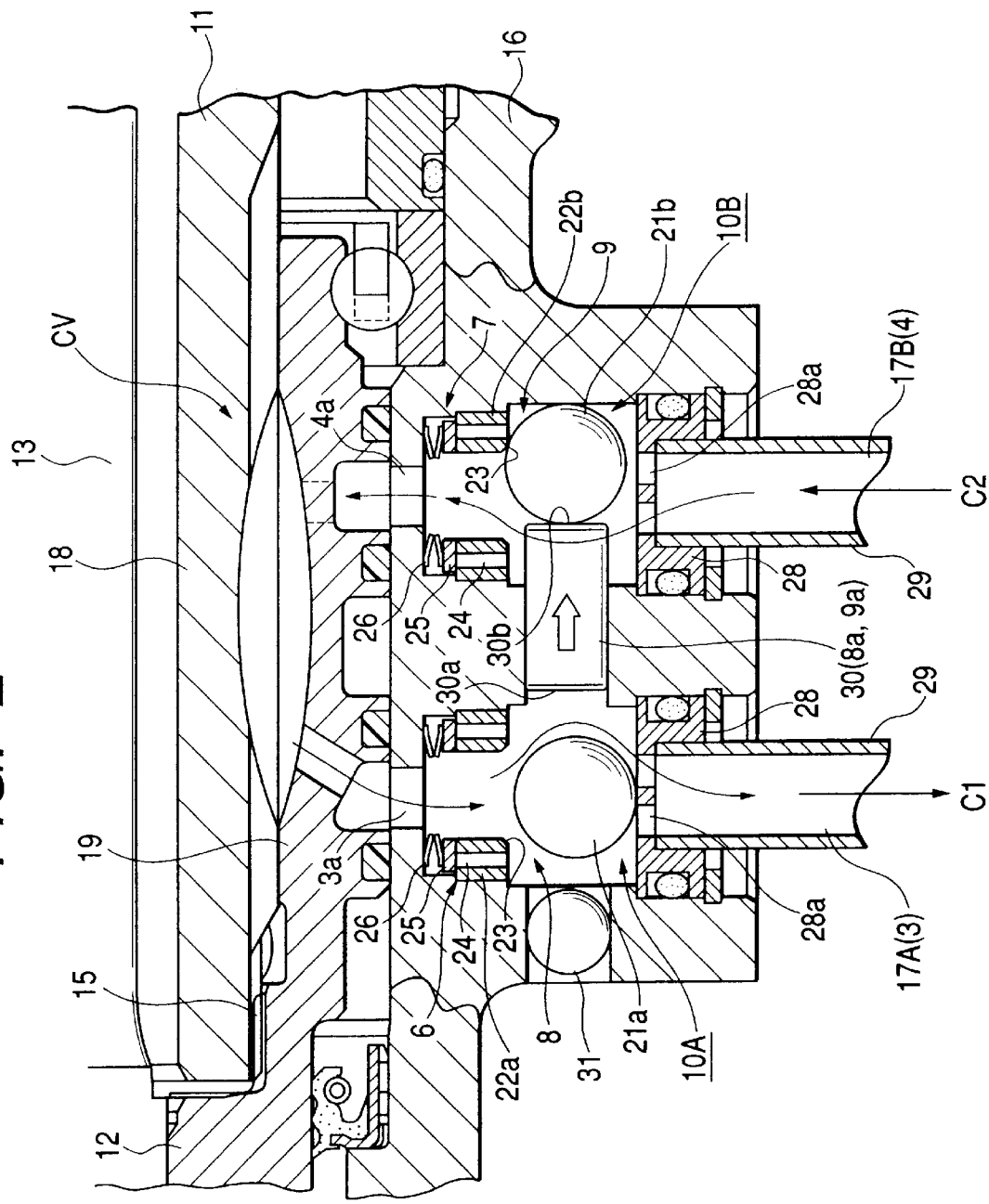
FIG. 2 is an enlarged cross sectional view showing a main portion of FIG. 1 and explaining a state at a positive input time together with a steering operation.

FIGS. 1 to 4 show a case in which the steering damper in accordance with the present invention is applied to a rack and pinion type power steering apparatus, and FIGS. 1 and 2 are views showing a state that the power steering apparatus is operated at the positive input time in accordance with the steering operation of the steering handle. Further, FIG. 3 shows a state at the reverse input time due to the kickback or the like in the steered wheel side (at a time when the reverse input is operated to the return side during the non-steering time and the steering time) and FIG. 4 shows a state that the reverse input is operated in a further turning direction during the steering operation.

In these views, an element wholly denoted by reference numeral 1 is a power steering main body portion in the rack and pinion type power steering apparatus.

Reference numeral 11 denotes a stub shaft corresponding to an input shaft connected to the steering handle (not shown), and reference numeral 12 denotes a pinion shaft connected to an inner end (a left end) side of the stub shaft 11 via a torsion bar 13. A pinion 12a engaged with a rack 14a on a rack 14 constituting a steering link mechanism (not shown) is provided in the pinion shaft 12. A safety spline 15 constituted by a protruding portion and a groove portion is provided as a fail safe mechanism for allowing a relative rotational displacement within a predetermined angle range due to a twisting motion of the torsion bar 13 between both of the shafts 11 and 12.

Reference numeral 16 denotes a steering body constituting the power steering main body portion. The steering body 16 is integrally structured so as to include a valve housing of a rotary type flow passage control valve CV mentioned below and a body portion forming a cylindrical space for slidably holding the rack shaft 14. Both of the shafts 11 and 12 mentioned above are rotatably supported by an axial supporting portion such as a bearing or the like, and an oil seal is interposed at a proper position.

A rotor 18 and a sleeve 19 constituting the rotary type flow passage control valve CV are integrally provided in the inner end sides of the shafts 11 and 12, respectively. The flow passage among the pump P, the tank T and the left and right chambers C1 and C2 of the power cylinder P/C can be switched due to the relative rotational displacement of the rotor 18 and the sleeve 19 as shown in FIG. 7.

The structures of the rotor 18 and the sleeve 19 which constitute the rotary type flow passage control valve CV, and the structure of the hydraulic circuit in the valve housing portion (the body portion 16) are the same as the widely known structure or similar thereto. That is, a plurality of passage grooves are recessed as valve grooves at a predetermined interval in a peripheral direction, on an outer peripheral surface of the rotor 18 and an inner peripheral surface of the sleeve 19 which are slidably brought into contact with each other in an opposing manner, and a plurality of fluid supplying holes and fluid discharging holes are pierced and formed at proper portions, so that the hydraulic circuit can be switched and controlled as occasion demands by selectively communicating and shutting these passage grooves or the like.

Further, an inlet port 2a through which the pressurized oil fed from the pump P flows in, a return port 5a which returns the pressurized oil to the tank T, and passages 2b and 5b reaching thereto are provided in the steering body 16 installing the flow passage control valve CV therein.

Reference numerals 17A and 17B denote left and right output ports connected to the left and right chambers C1 and C2 of the power cylinder P/C. The output ports 17A and 17B optionally communicate and shut the hydraulic passage between the ports in accordance with the rotational displacement caused by the steering operation of the flow passage control valve CV mentioned above so as to control a generation of the power assisting force in the power cylinder, as is widely known.

In accordance with the present invention, in the steering body 16 having the structure mentioned above, left and right damper portions 10A and 10B constituted by the variable throttle valves 6 and 7 and the pilot operated check valves 8 and 9 are provided in portions to which the left and right cylinder passages (the passage portions) 3a and 4a reaching the left and right output ports 17A and 17B are close, in a parallel manner, as shown in FIGS. 1 to 4. A pilot plunger 30 is provided between the left and right damper portions 10A and 10B so as to freely slide.

The pilot plunger 30 functions as the pilot pressure transmitting means 8a and 9a mentioned above, and is slidably held within the hold portion communicating between the left and right cylinder passages 3 and 4. Further, the pilot plunger 30 faces end portions 30a and 30b thereof within the left and right cylinder passages 3 and 4, as shown in FIGS. 1 to 4, thereby serving as the pressure receiving surface receiving the fluid pressure within the passages 3 and 4, and operates due to the fluid pressure within one of the cylinder passages 4 and 3, thereby serving as an operating surface for opening the pilot operated check valve 8 or 9 of another cylinder passage 3 or 4.

Describing this in detail, the pilot operated check valves 8 and 9 are constituted by ball valves in which balls 21a and 21b are set to valve bodies and cylindrical seat members 22a and 22b are set to valve seats. The cylindrical seat members 22a and 22b are provided by being fitted to a part of the passage portions 3a and 4a of the left and right cylinder passages 3 and 4. The cylindrical seat members 22a and 22b are structured such that the balls 21a and 21b seat on the seat portions 23 and 23 formed in one end (a lower end in the drawing) thereof so as to close the cylinder passage 3 and 4 and move apart therefrom so as to open the passages 3 and 4.

The balls 21a and 21b are opened by the pressure fluid flowing from the flow passage control valve CV to the left and right chambers C1 and C2 of the power cylinder, when the pilot plunger 30 moves due to the fluid pressure (the pilot pressure) within the opposing cylinder passage 4 or 3, the balls 21a and 21b are pressed by the end portion 30a or 30b so as to be apart from the seat portion 23, whereby the check valve 8 or 9 is opened.

The variable throttle valves 6 and 7 are constituted, as shown in FIGS. 2 to 4, 5A and 5B, by a plurality of (four in this case) through holes 24 pieced in an axial direction in a periphery of the seat portion 23 in the cylindrical seat members 22a and 22b, an annular valve plate 25 arranged at another end of the through holes 24, and urging means 26 such as a disc spring or the like for urging the valve plate 25 so as to close the through hole 24.

The variable throttle valves 6 and 7 secure the return side flow passage when the pilot operated check valves 8 and 9 are closed, in the case that the reverse input such as the kickback or the like is applied to the steered wheel side and the fluid pressure between the left and right chambers C1 and C2 and the left and right damper portions 10A and 10B is increased, and constitute a throttle passage obtaining a damper function by applying the flow passage resistance to the return side flow in accordance with a valve opening degree and an opening and closing operation so as to damp and reduce.

A notch 27 is formed in a part of an outer peripheral portion of the cylindrical seat members 22a and 22b, as shown in FIGS. 5A and 5B. The notch 27 is provided for securing the return side flow when a flow amount within the cylinder passages 3 and 4 is small. Further, when the flow amount within the cylinder passages 3 and 4 is increased, the valve plate 25 opens against the urging force of the urging means 26 so as to apply the flow passage resistance to the return side flow.

In the embodiment, one end portion of a space in which the damper portions 10A and 10B of the left and right cylinder passages 3 and 4 are arranged and the balls 21a and 21b are assembled, is closed by a flange member 28, as shown in FIGS. 2 to 4, 6A and 6B. The flange member 28 is provided with a plurality of hole portions 28a for securing the cylinder passage 3 or 4, is provided in a front end of a pipe 29 forming the output ports 17A and 17B reaching the left and right chambers C1 and C2 of the cylinder, and is assembled and fixed to the steering body 6 via a seal member. In the drawings, reference numeral 31 denotes a sealing ball which pierces a through hole holding the plunger 30 from the outer side of the steering body 6 and closes a hole portion used for assembling the plunger 30.

In the structure mentioned above, the structure is made such as to move the valve plate 25 constituting the variable throttle valve 6 or 7 in an opening direction and open and close the variable throttle valves 6 and 7 at a desired valve opening degree when the pressurized oil fed from the output port 17A or 17B flows to the flow passage control valve CV side via the cylinder passage 3 or 4.

In this case, as the urging means 26 for urging the valve plate 25 constituting the variable throttle valves 6 and 7, it is possible to employ a structure having an urging force at such a degree as to open and close the opening end of the hole portion 24 by the plate 25.

In accordance with the steering damper 10 having the structure mentioned above, it is possible to obtain in a desired state an operation at the positive input time together with the steering operation as shown in FIG. 2, an operation when the reverse input is applied to the return side at the non-steering time or during the steering as shown in FIG. 3, and an operation when the reverse input is applied to the further turning side during the steering as shown in FIG. 4.

That is, at the positive input time, the pilot operated check valve 8 within one cylinder passage 3 is moved in an opening direction in accordance with the supply side flow as shown in FIG. 2, whereby the pressurized fluid is supplied to the cylinder chamber C1, and the return side flow via another cylinder passage 4 moves in the direction that the pilot operated check valve 9 is opened by the plot plunger 30, thereby smoothly obtaining the flow with no application of the flow passage resistance.

Further, since the fluid pressure within the cylinder passage 4 in the left and right chambers (C2 in this case) of the cylinder is increased as shown in FIG. 3 when the reverse input is applied at the non-steering time, the pilot operated check valve 9 is closed and it is possible to move the pilot operated check valve 8 in the opposite side in the opening direction by the motion of the pilot plunger 30. Then, the flow in the return side flows to the tank T side via the flow passage control valve CV while opening and closing the variable throttle valve 7 at a desired valve opening degree, and it is possible to prevent the reverse input from being transmitted due to a damper effect caused by being damped and reduced by the flow passage resistance applied at this time.

When the reverse input is applied in the returning direction opposite to the steering direction during the steering operation, the plunger 30 oppositely moves due to an increase of the return side fluid pressure so as to become in the state shown in FIG. 3 from the state shown in FIG. 2, so that it is possible to obtain a function as a damper.

Further, when the great reverse input is applied to the same direction as the steering direction (the further turning side) during the steering operation, the state is changed from the state shown in FIG. 2 to the state shown in FIG. 4, and it is possible to obtain a function as the damper.

Figure 8:
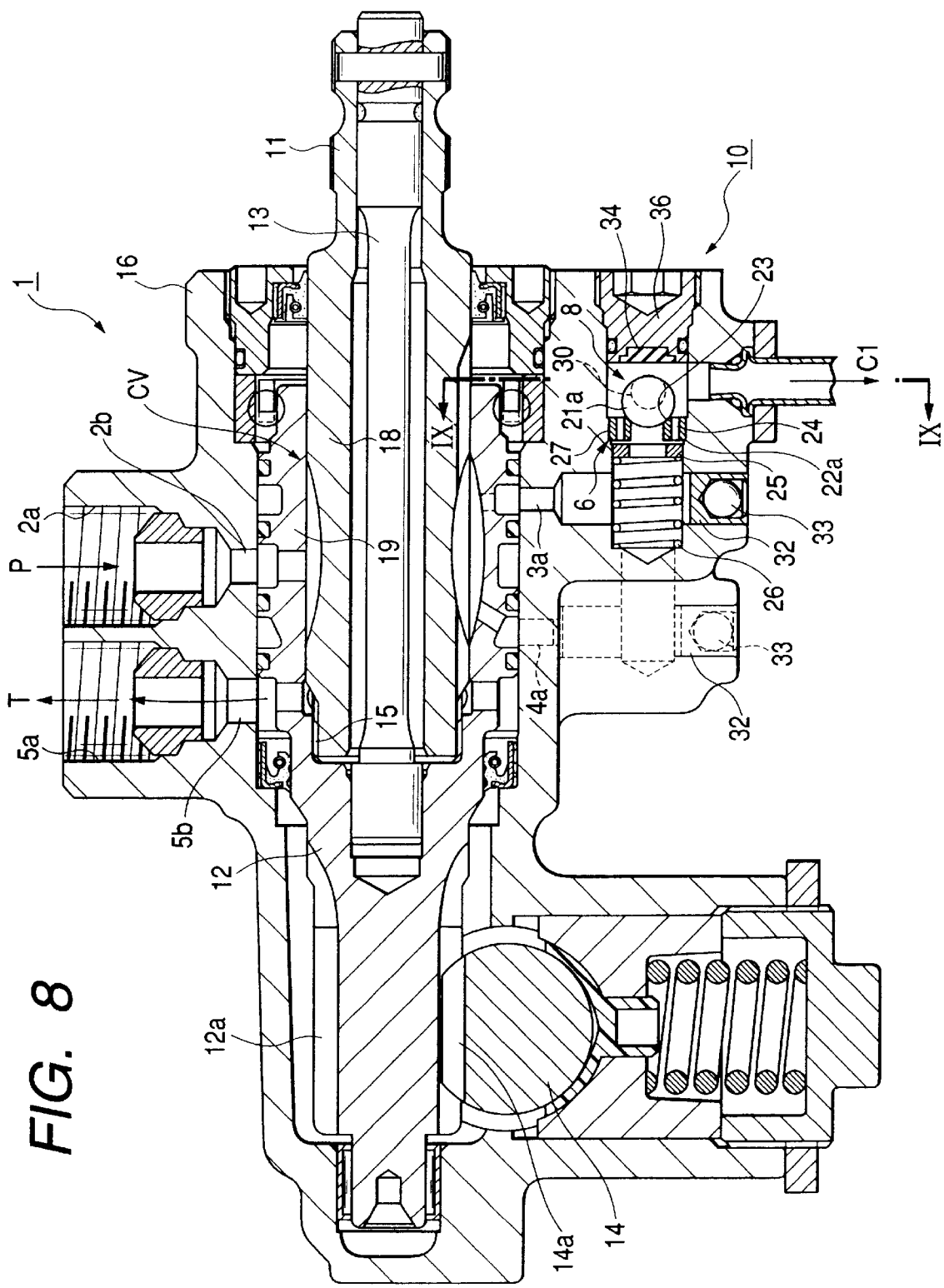
FIG. 8 is a cross sectional view showing a second embodiment of a steering damper in accordance with the present invention and showing a main portion of a main body portion of a power steering apparatus to which the steering damper is applied.
Figure 9A:
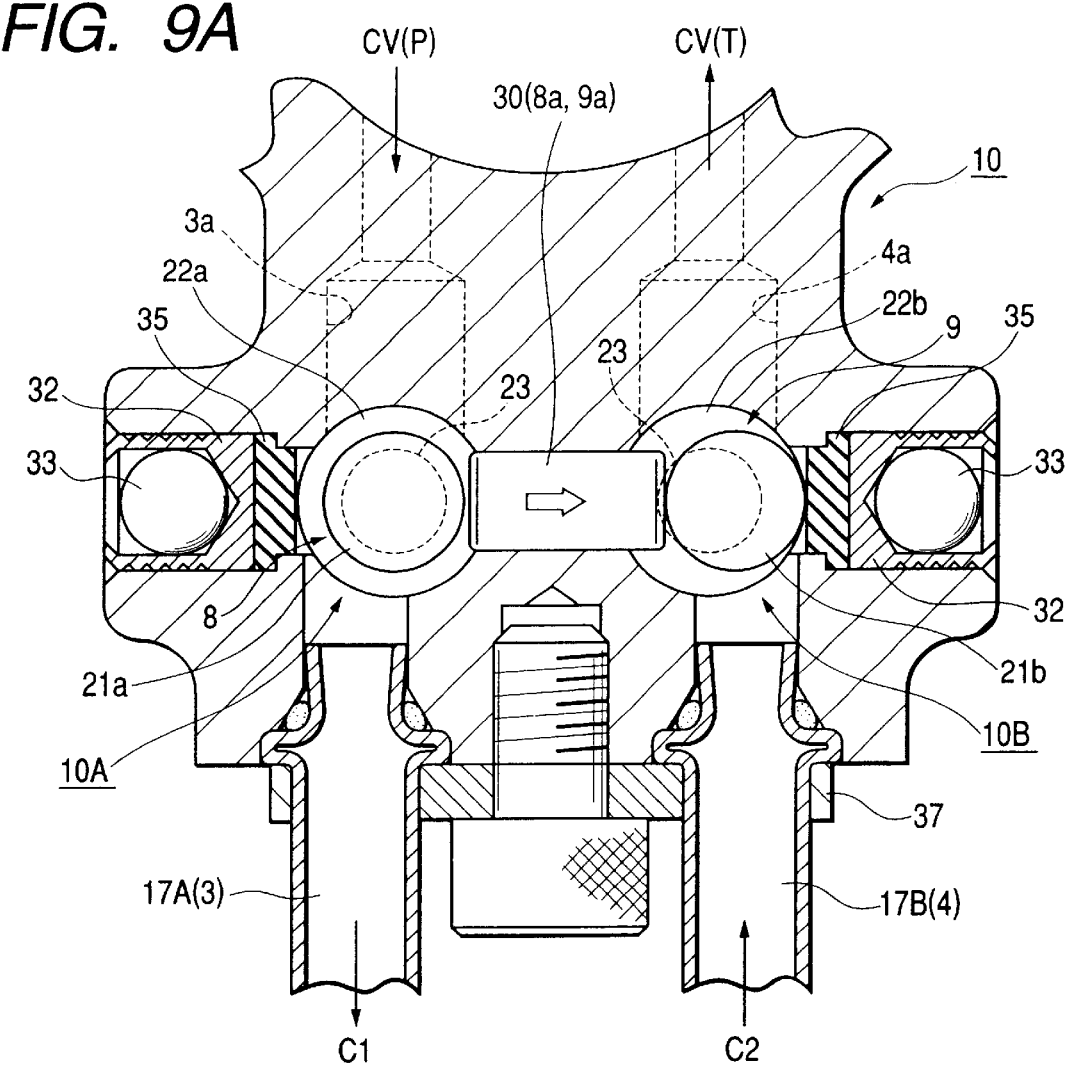
Figure 9B:
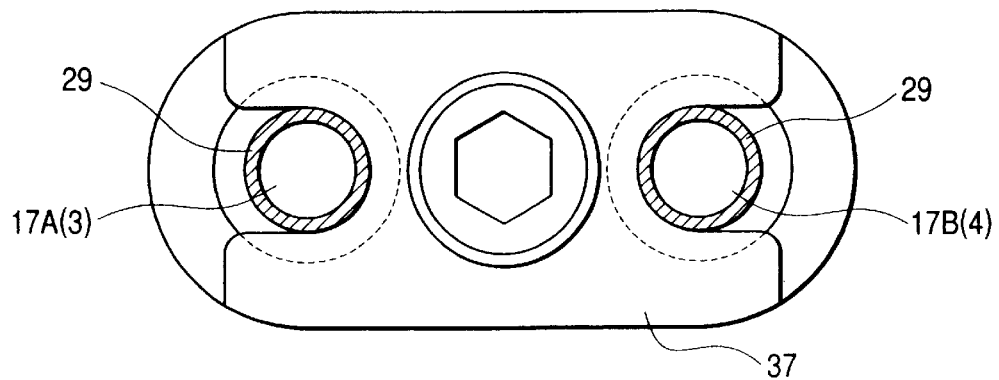

FIGS. 8, 9A and 9B show a second embodiment of a steering damper in accordance with the present invention. This embodiment corresponds to a modified embodiment of the first embodiment mentioned above. That is, in this embodiment, a consideration is given to an easiness of installing the left and right damper portions 10A and 10B to the steering body 16, a simplicity of structure, an easiness of connecting the pipe to the outer portion of the body 16 and the like which are not so much considered in the first embodiment mentioned above.

In accordance with this embodiment, the steering damper 10 can be assembled to the steering body 16 from the same direction as the stub shaft 11 and the like, a seal member comprising a cover body 32 and a ball 33 is inserted from the other direction. Further, the embodiment is structured such that the balls 21a and 21b constituting the pilot operated check valves 8 and 9 ride on the seal portion 23 due to empty weight. This is apparent from the matter that the rack side in FIG. 8 is directed downward when the power steering apparatus is mounted on the vehicle.

Further, in accordance with this embodiment, the structure is made such that the generation of the striking sound due to the motion of the balls 21a and 21b is reduced by making the passage diameter smaller than the balls 21a and 21b and making the ball installing space as small as possible. Reference numerals 34 and 35 in the drawings denote a damping material such as a rubber or the like. The damping material is used for reducing the striking sound due to the collision with the balls 21a and 21b. Reference numeral 36 denotes a plug for closing the installing space of the check valves 8 and 9, and reference numeral 37 denotes a pressing plate for engaging with the pipe 29 constituting the output ports 17A and 17B and screwed with the body 16. Further, in this case, a compression coil spring is employed for the urging means 26.

A movement of the steering damper 10 in the structure mentioned above is as described in the embodiment mentioned above, and a description thereof will be omitted here.

Figure 10:
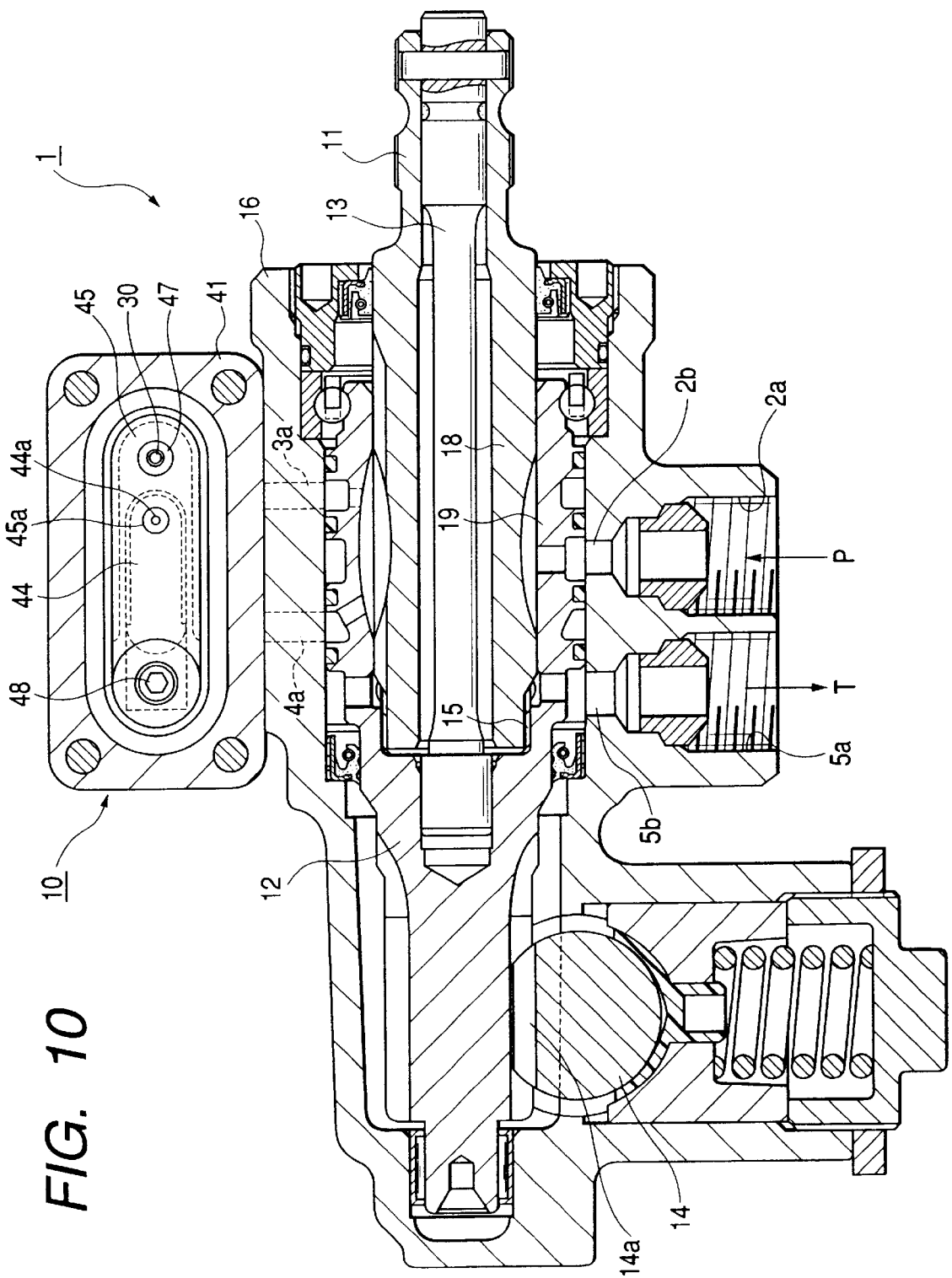
FIG. 10 is a cross sectional view showing a third embodiment of a steering damper in accordance with the present invention and showing a main portion of a main body portion of a power steering apparatus to which the steering damper is applied.

FIGS. 10 to 13 show a third embodiment in accordance with the present invention. In this embodiment, as shown in FIG. 10, a block 40 constituting the steering damper 10 is integrally fixed to one side of the steering body 16 by means of screwing or the like.

The block 40 is provided with a block main body 41 having a partition in a center portion and left and right plates 42 and 43 screwed to both sides thereof, and forms two sectioned left and right empty chambers there within.

Figure 11:
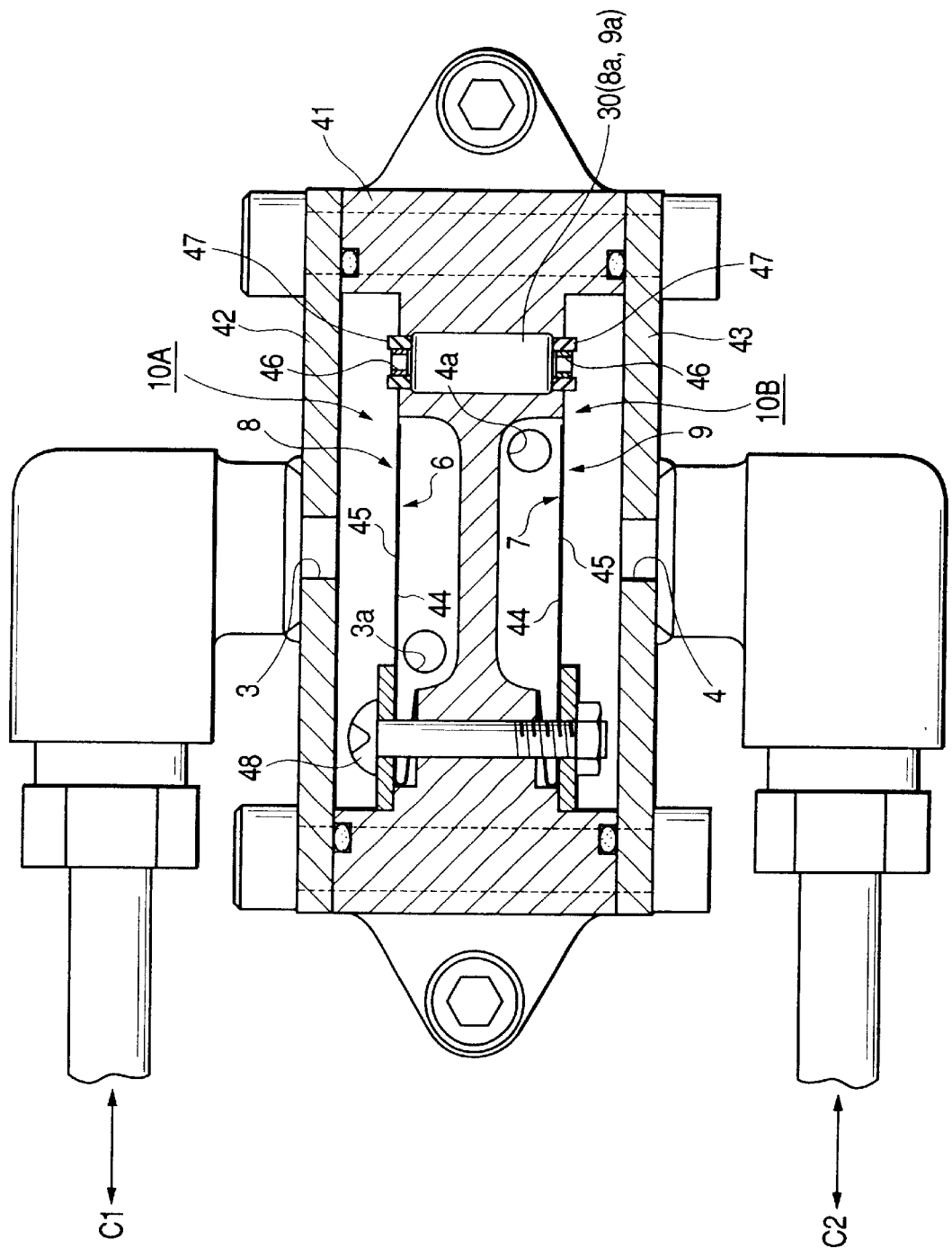
FIG. 11 is a cross sectional view of a main portion in which a steering damper portion corresponding to a main portion in FIG. 10 is enlarged.
Figure 12:
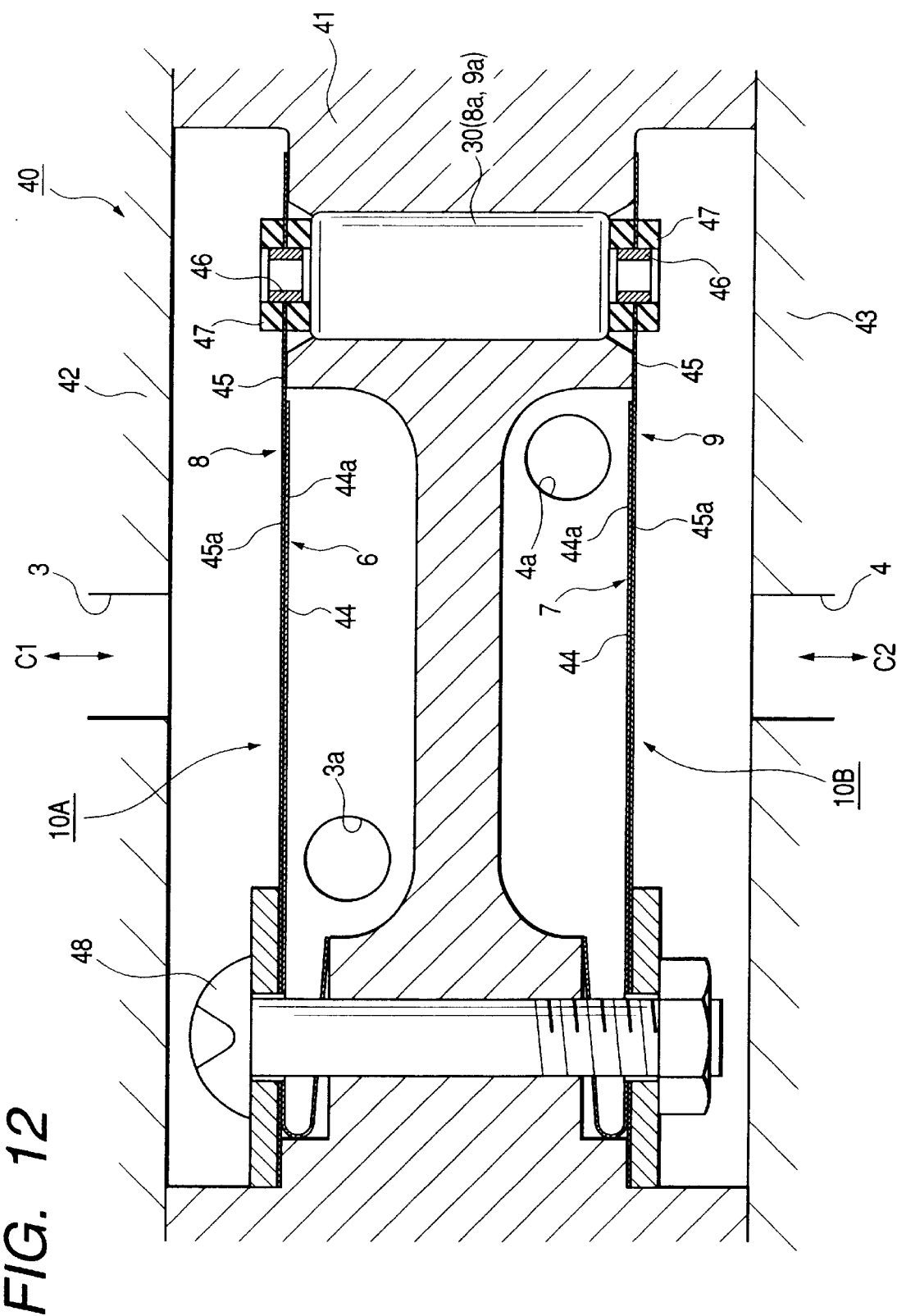
FIG. 12 is a view showing a variable. throttle valve and a pilot operated check valve of right and left damper portions in the steering damper portion in FIG. 11.
Figure 13:
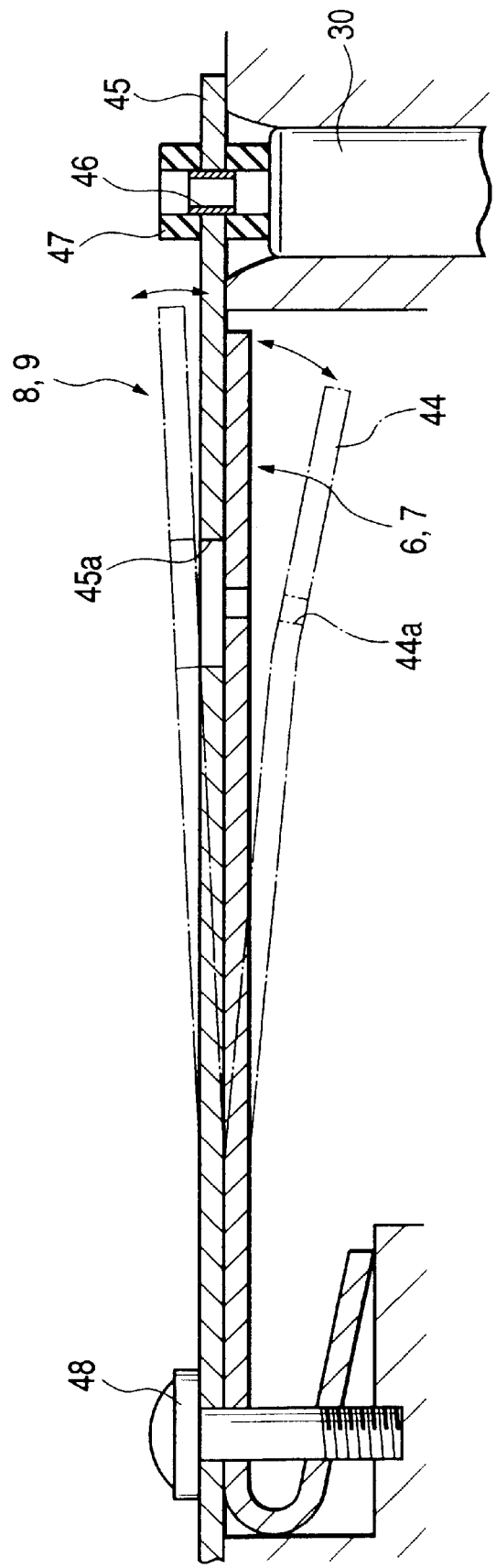
FIG. 13 is a schematic view for explaining a movement of the variable throttle valve and the pilot operated check valve in FIG. 12.

A member constituting left and right damper portions 10A and 10B is, as shown in FIGS. 11 to 13, arranged in the two empty chambers, and each of the empty chambers is connected to passages (3a and 4a in the drawings) in a side of the flow passage control valve CV and passages (3 and 4 in the drawings) in a side of cylinder left and right chambers C1 and C2 in the left and right cylinder passages 3 and 4, respectively. In these empty chambers, in a state of partitioning between the passages 3a, 3, 4a and 4, two leaf springs 44 and 45 are provided in a state of being screwed at a base end side.

The two leaf springs 44 and 45 correspond to the members constituting the variable throttle valves 6 and 7 and the pilot operated check valves 8 and 9 constituting the left and right damper portions 10A and 10B. The leaf springs 45 and 45 constituting the pilot operated check valves 8 and 9 are extended in a longitudinal direction, and the pilot plunger 30 is arranged between the extended end portions. Each of the end portions of the pilot plunger 30 faces to each of the empty chambers and is structured such as to be moved in accordance with the fluid pressure of the left and right cylinder passages 3 and 4.

Reference numerals 46 in the drawings denotes a cylinder body provided in such a manner as to extend through the extended end portions of the leaf springs 45 and 45, and reference numeral 47 denotes a damping member such as a cylindrical rubber adhered to the cylinder bodies 46 and 46 and the leaf springs 45 and 45 due to a seizure or the like. The damping member 47 is structured such as to reduce the striking sound generated by the collision between the pilot plunger 30, the leaf springs 45 and 45 and the left and right plates 42 and 43. Reference numeral 48 denotes a screw for fixing the base end portions of the two leaf springs 44 and 45. In this case, both of the leaf springs 44 and 45 of the left and right dampers 10A and 10B are integrally fixed by one screw 48 and nut.

The leaf spring 45 constituting the pilot operated check valves 8 and 9 and the leaf spring 44 constituting the variable throttle valves 6 and 7 are provided in a state that the opening directions thereof are inverted. In this case, a large opening 45a is pierced in the leaf spring 45 and a small hole 44a allowing a flow from the cylinder chamber C1 or C2 when a flow amount is a little is formed in the leaf spring 44.

In the structure mentioned above, in the same manner as the embodiment mentioned above, when one of the pilot operated check valves 8 and 9 is opened by the pressurized fluid flow from the flow passage control valve CV to the cylinder chamber C1 or C2, another thereof is opened by the pilot plunger 30, so that it is possible to secure a turn following characteristic at the positive input time.

Further, when the reverse input is applied, the flow passage resistance is applied to the return side flow in accordance with the throttle operation by one variable throttle valve 6 or 7 so as to damp and reduce the impact, and another pilot operated check valve 9 or 8 is opened by the pilot plunger 30 so as to secure the fluid supply to another cylinder chamber, whereby it is possible to obtain a function as the damper.

When the variable throttle valves 6 and 7 and the pilot operated check valves 8 and 9 are constructed by overlapping two leaf springs 44 and 45 in the manner of this embodiment, there is an advantage that it is possible to simply adjust the operation timing of these valves.

In this case, the present invention is not limited to the structure described in the embodiments mentioned above, and it is a matter of course that a shape, a structure and the like of each of the portions can be modified. For example, in the embodiment mentioned above, the description is given of the case that the steering damper 10 is applied to the rack and pinion type power steering apparatus 1, however, the structure is not limited to this, and the steering damper 10 can be applied to the other types of power steering apparatuses 1.

Further, in the embodiments mentioned above, the description is given of the case that the damper portions 10A and 10B constituted by the variable throttles 6 and 7 and the pilot operated check valves 8 and 9 which constitute the steering damper 10 are integrally formed by using the outer peripheral portion of the steering body 16 or the block 40 attached thereto, however, the structure is not limited to this.

Further, in the steering body 16, the left and right damper portions 10A and 10B attached to the left and right cylinder passages 3 and 4 can be provided at a proper position in the peripheral direction of the steering body 16. In summary, it is sufficient that the left and right damper portions 10A and 10B are provided in the left and right cylinder passages 3 and 4 adjacent thereto.

Further, in the embodiments mentioned above, the description is given of the case that the variable throttle valves 6 and 7 and the pilot operated check valves 8 and 9 are constituted by the combination between the plate valve and the ball valve or the combination between two leaf springs 44 and 45, however, the present invention is not limited to this.

As mentioned above, in accordance with the steering damper of the present invention, it is possible to damp and reduce the impact at the reverse input time such as the kickback from the steered wheel side or the like by the flow passage resistance of the variable throttle valve provided in the left and right cylinder passages, whereby the damper function can be achieved.

Further, in accordance with the present invention, by the pilot operated check valve provided in the variable throttle valves in the left and right cylinder passages in parallel, it is possible to securely supply the pressurized fluid to the supply side cylinder chamber from the pump at the positive input time generated by the steering operation by the steering handle, and it is possible to make the flow passage resistance of the flow from the return side cylinder chamber to the tank minimum by passing through the pilot operated check valve opened in accordance with the pilot pressure from the supply side passage, whereby it is possible to suitably operate the power cylinder and a performance of the turn following characteristic is not deteriorated.

Further, in accordance with the present invention, since one pilot plunger having respective end portions functioning the pressure receiving surface and the operating surface is employed in order to make the left and right pilot operated check valves operate the fluid pressure within the opposing side passage as the pilot pressure, the number of the parts can be reduced, the structure thereof can be made simple and the assembly thereof can be comparatively easily performed. Further, in the steering damper mentioned above, a whole of the apparatus can be made compact and the cost thereof can be reduced.

What is claimed is:

1. A steering damper attached to a power steering apparatus having a flow passage control valve for selectively switching and connecting among a pump, a tank and right and left chambers in a power cylinder in correspondence to a steering operation, and a pair of right and left cylinder passages for connecting the flow passage control valve to the right and left chambers in the power cylinder, the steering damper comprising:

a pair of right and left damper portions each having a variable throttle valve arranged in the middle of each of the pair of cylinder passages and limiting an inflow to the flow passage control valve from the power cylinder and a pilot operated check valve connected to the variable throttle valve in parallel and allowing an inflow from the flow passage control valve to the power cylinder, the pair of right and left damper portions positioned close to each other; and a pilot plunger sliding between the right and left damper portions,
wherein end portions of the pilot plunger are faced within the right and the left cylinder passages to form a pressure receiving surface for receiving the respective fluid pressure; and
the end portions of the pilot plunger are operated by the fluid pressure within one of the cylinder passages to form an operating surface for opening the pilot operated check valve in the other of the one of the cylinder passages.

2. The steering damper according to claim 1, wherein a minimum valve opening degree of the variable throttle valve is set to allow a flow of the pressurized fluid when a flow amount within the cylinder passage is a little and to apply a resistance to the flow of the pressurized fluid when the flow amount within the cylinder passage is increased.

3. The steering damper according to claim 1, wherein the pilot operated check valve includes a ball and a cylindrical seat portion; and the variable throttle valve includes a hole portion formed from one end of the cylindrical seat portion to another end thereof and a valve plate opening and closing another end of the hole portion.

4. The steering damper according to claim 1, wherein both of the pilot operated check valve and the variable throttle valve include valves each having a valve body formed by a leaf spring.

5. The steering damper according to claim 4, wherein the leaf spring of the pilot operated check valve and the leaf spring of the variable throttle valve are overlapped with each other in a state that the leaf springs are opened in opposite directions to each other.

6. A power steering apparatus comprising:

a pump for supplying oil pressure;

a tank for receiving returned oil;

a power cylinder having right and left chambers;

a flow passage control valve for selectively switching and connecting among the pump, the tank and the right and left chambers in the power cylinder in correspondence to a steering operation;

a pair of right and left cylinder passages for connecting the flow passage control valve to the right and left chambers in the power cylinder;

a pair of right and left damper portions each having a variable throttle valve arranged in the middle of each of the pair of cylinder passages and limiting an inflow to the flow passage control valve from the power cylinder and a pilot operated check valve connected to the variable throttle valve in parallel and allowing an inflow from the flow passage control valve to the power cylinder, the pair of right and left damper portions positioned close to each other; and a pilot plunger sliding between the right and left damper portions, wherein end portions of the pilot plunger are faced within the right and the left cylinder passages to form a pressure receiving surface for receiving the respective fluid pressure; and the end portions of the pilot plunger are operated by the fluid pressure within one of the cylinder passages to form an operating surface for opening the pilot operated check valve in the other of the one of the cylinder passages.

7. The power steering apparatus according to claim 6, wherein a minimum valve opening degree of the variable throttle valve is set to allow a flow of the pressurized fluid when a flow amount within the cylinder passage is a little and to apply a resistance to the flow of the pressurized fluid when the flow amount within the cylinder passage is increased.

8. The power steering apparatus according to claim 6, wherein the pilot operated check valve includes a ball and a cylindrical seat portion; and the variable throttle valve includes a hole portion formed from one end of the cylindrical seat portion to another end thereof and a valve plate opening and closing another end of the hole portion.

9. The power steering apparatus according to claim 6, wherein both of the pilot operated check valve and the variable throttle valve include valves each having a valve body formed by a leaf spring.

10. The power steering apparatus according to claim 9, wherein the leaf spring of the pilot operated check valve and the leaf spring of the variable throttle valve are overlapped with each other in a state that the leaf springs are opened in opposite directions to each other.

* * * * *